United States Patent [19]
McKinstry

[11] 3,854,918
[45] Dec. 17, 1974

[54] METHOD FOR CONTINUOUS HEAT TREATING OF GLASS ARTICLES

[75] Inventor: Richard G. McKinstry, Lancaster, Ohio

[73] Assignee: Anchor Hocking Corporation, Lancaster, Ohio

[22] Filed: Nov. 19, 1973

[21] Appl. No.: 416,983

Related U.S. Application Data

[60] Division of Ser. No. 238,355, March 27, 1972, Pat. No. 3,807,943, which is a continuation-in-part of Ser. No. 62,489, Aug. 10, 1970, Pat. No. 3,659,551.

[52] U.S. Cl............... 65/30, 65/119, 65/350, 65/351, 65/355, 117/107.2 R, 432/135, 432/146, 432/209
[51] Int. Cl...................... C03c 21/00, C03b 25/04
[58] Field of Search ............ 65/117, 118, 119, 348, 65/349, 350, 351, 355, 356, 30, 60; 117/107.2 R; 432/135, 146, 209

[56] References Cited
UNITED STATES PATENTS

| | | |
|---|---|---|
| 1,472,401 | 10/1923 | Roberts................................ 432/26 |
| 2,143,525 | 1/1939 | Salerno............................... 432/135 |
| 3,259,481 | 7/1966 | Fuller et al. ....................... 65/119 X |
| 3,294,575 | 12/1966 | Barnes et al. ............ 117/107.2 R X |
| 3,741,744 | 6/1973 | Bowman.............................. 65/348 |

Primary Examiner—Arthur D. Kellogg
Attorney, Agent, or Firm—Richard H. Evans

[57] ABSTRACT

A furnace for treatment at elevated temperature of articles moving on a conveyor. The conveyor travels through a horizontal open-ended tunnel which is centered axially within a surrounding hollow combustion enclosure. The enclosure includes an inner wall that is spaced from the tunnel so that a generally annular combustion space or zone is presented between the enclosure inner wall and the tunnel. Burning gases are injected tangentially into the combustion zone and establish a swirling movement of the burning gas around the outside of the tunnel. The articles may be contacted with a treating vapor while in the tunnel.

5 Claims, 7 Drawing Figures

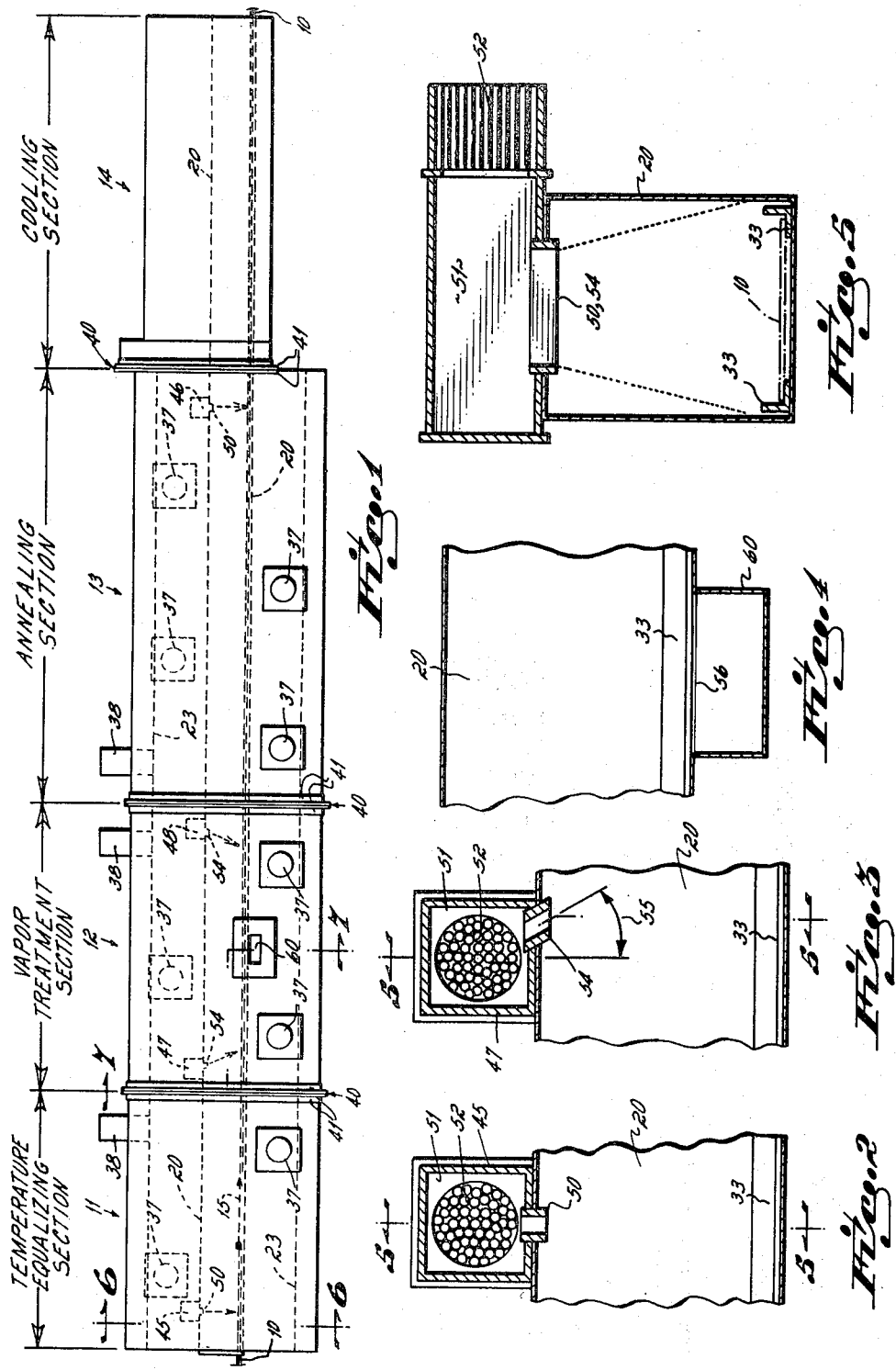

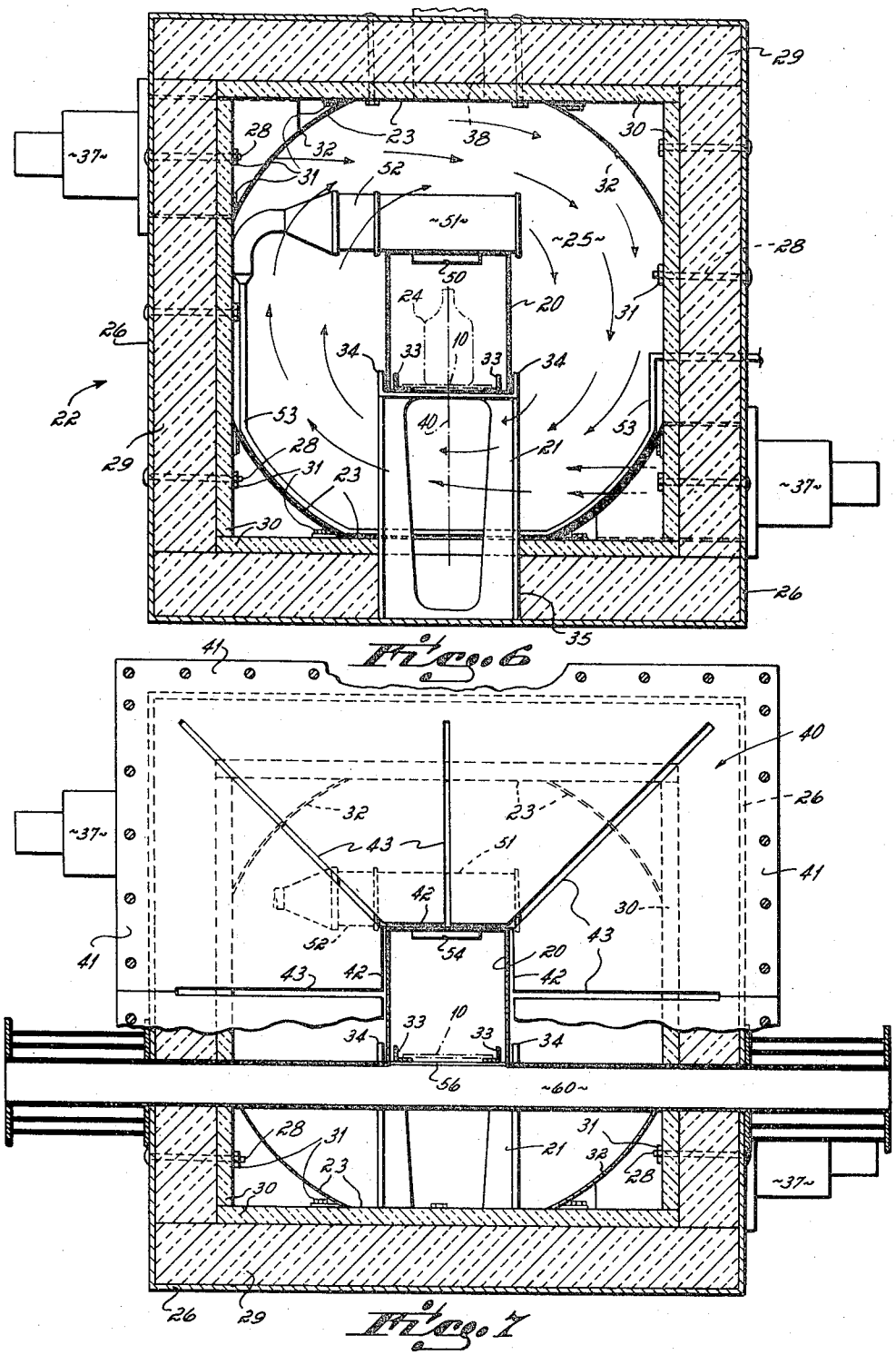

METHOD FOR CONTINUOUS HEAT TREATING OF GLASS ARTICLES

This is a division of application Ser. No. 238,355, filed Mar. 27, 1972, now U.S. Pat. No. 3,807,943, which is a continuation-in-part of my copending application Ser. No. 62,489, titled "Glass Treating Tunnel," filed Aug. 10, 1970, now U.S. Pat. No. 3,659,551, issued May 2, 1972.

The present invention relates to furnaces for elevated temperature treatment of articles moving on a conveyor. More particularly, it is directed to a gas fired furnace wherein the articles may be contacted with a special treating vapor while they are passing through a tunnel or muffle by which the vapor is isolated from the gas flame and the products of combustion.

Various manufacturing processes include a step wherein articles are exposed to and treated by a hot vapor of some type. For example, in the manufacture of glass articles such as lightweight bottles for carbonated beverages, the bottles may advantageously be subjected to a vapor treatment at elevated temperature, in order to improve the strength and abrasion resistance of the bottles. A cuprous halogen vapor can be used in that process, such as cuprous chloride ($Cu_2Cl_2$). The vapor is maintained at a temperature of the order of about 1,000°F. for an exposure or treating period that typically is of several minutes' duration. Examples of such processes are set forth in F. J. Shonebarger U.S. Pat. No. 3,489,546, titled "Strengthening of Oxidized Soda-Lime Glass Articles," issued Jan. 13, 1970, and U.S. Pat. No. 3,502,454, titled "Strengthening and Coloring of Articles Made of Reduced Soda-Lime Glass Compositions," issued Mar. 24, 1970.

The present furnace is useful in such cuprous halogen vapor treatment of glass containers, and it is explained hereinafter primarily in relation to such processes. However, it should be understood that the furnace is suitable for use in carrying out other high temperature treatments of articles moving on a conveyor such as decorating or annealing, with or without the presence of a special vapor.

As set forth in the Shonebarger patents referred to above, when the vapor contacts the glass surface an ion exchange reaction takes place whereby the sodium ion content of the glass surface is partly replaced by copper ions. This modifies the composition of the glass in a thin surface zone on the article. The resulting modified glass is believed to have a lower coefficient of expansion than the remainder of the article, and on cooling it forms a compression layer which improves the strength of the article.

To carry out such vapor treatments on a production basis, it is desirable to treat the bottles while they are moving on a conveyor line; that is, a continuous treatment rather than a batch treatment. Advantageously, this is done while the bottles are moving on the take-off conveyor on which they are placed directly from the forming machine.

Previously identified patent application Ser. No. 62,489 is directed to one type of furnace that is useful for carrying out processes such as the cuprous halogen vapor treatment. An electrically heated furnace is described there, in which the heater elements are situated within the vapor contacting zone; the vapor is not isolated from the heat source.

It has been found over a period of time that the cuprous halogen vapor in such an electrical furnace will gradually attack and corrode the furnace structure, especially the electrical heater elements. This can seriously reduce their operating life which is, of course, detrimental to process economics.

A further concern is the fact that the presence of water vapor in the vapor containing zone can be detrimental. If gas is used as the heat source, the water vapor resulting from combustion of the gas will react with the cuprous vapor; this leads to an unduly rapid rate off consumption of the cuprous vapor source. A copper oxide deposit can also form. This detracts from efficient practice of that process in an open gas flame environment.

The present invention concerns a continuous, gas fired muffle furnace in which the flame and products of combustion are isolated from the articles being treated. The articles move through the furnace on a traveling conveyor that runs through a tubular or tunnel like muffle, which is heated by flame contacting only its exterior surface. Articles on the conveyor inside the tunnel are thereby isolated from the flame.

The cuprous halogen vapor treating process is sensitive to temperature, temperature control being important for article to article uniformity and quality control. Small temperature variations can cause visible differences in the color of certain types of containers. Also, the nature of the compression band formed on the surface of the articles by the treatment is dependent upon the time-temperature cycle, a shorter, hotter cycle tending to produce a more sharply defined band, and, hence, a greater compressive strength with resultant higher article strength. Relatively longer and cooler exposures tend to establish wider compression bands, with a smaller strength improvement, in addition to reducing process throughput.

Moreover, it is important that the temperature be uniform from top to bottom of the article. The tall and narrow shape of the bottles themselves makes them especially susceptible to tunnel temperature variation in the vertical direction. This is difficult to achieve in a long horizontal continuous furnace, wherein the ends of the muffle must be open to accommodate the travel of the conveyor through them. A full range of glass containers will require a tunnel height of about 15 inches. It has been found that unless special provision is made to establish vertical temperature uniformity, heat applied to the outside of the muffle will tend to establish vertical convection currents in the muffle such that the top part of the muffle (and hence the upper portions of the bottles) will be heated more than the bottom part, such that undesirably non-uniform treatment results.

It has been a major objective of the present invention to provide a continuous horizontal muffle furnace which is exteriorily heated by a flame pattern that will establish a high degree of temperature uniformity, as measured in the vertical direction at any given station inside the muffle.

In the cuprous halogen vapor treatment of bottles and in other heat treating processes, controlled temperature variation along the direction of travel is necessary. A proper thermal cycle or time-temperature schedule as the ware moves along the conveyor is needed to produce ware of constant quality, and to produce the desired strengthening in minimum time. To achieve this, it is important that the temperature of the ware (which at each moment should be uniform across its entire vertical height) change according to a predetermined schedule as the conveyor travels through the muffle. In particular, for cuprous halogen vapor treatment processing of containers, the temperature should rise above the annealing point of the articles, to a level as hot as possible but not, of course, so high as to cause undesirable deformation or sag; the temperature should remain at that level during the vapor treatment, then cool.

It has been a major objective of the present invention to provide a furnace whereby the temperature of articles moving on a conveyor inside the muffle will follow a desired schedule or profile as they move in the horizontal direction, but such that at any given point on the conveyor the articles have a nearly flat vertical temperature profile.

In the preferred embodiment, the furnace of this invention contemplates a combustion enclosure within which a hollow, generally circular cross-sectioned combustion zone is defined. An elongated open ended tunnel or muffle runs through the combustion zone, aligned substantially along the axis thereof, and is supported on "stilts" or open stands in the combustion zone so that all sides of the tunnel are exposed to and acted upon by flame within the combustion zone. The tunnel includes means for supporting and guiding a conveyor, which travels through it from end to end.

The combustion zone and the tunnel within it are heated by a plurality of gas burners which inject gas flames into the combustion zone only. The burners enter the zone through an inside wall of the combustion enclosure, and they are directed so that flame will circulate circumferentially around the tunnel in the zone; that is to say, the burner flames are injected tangentially into the space between the tunnel and the inner wall of the combustion enclosure.

The burners are preferably of the excess air type and have a high output volume of gases. These gases are curled or wrapped circumferentially around the tunnel to completely envelop it. The burners are placed at angularly spaced positions around the tunnel, one burner entering the combustion zone above the tunnel on one side thereof, a next burner entering the combustion zone on the other side and below the tunnel. Thus the output gases from each burner reinforce one another in traveling less than the full circumference of the tunnel. The burners are preferably spaced axially from one another. The output gases travel to an exhaust or outlet stack, which extends from the combustion zone through the wall of the furnace, and which is spaced longitudinally of the tunnel from the burners. The motion of the gas around the tunnel describes a horizontal spiral or helix as it travels to the exhaust.

The ends of each combustion zone are closed by bulkheads, and there may be a plurality of combustion sections along the tunnel such that the temperature in each section can be controlled essentially independently of the temperature in adjacent sections. The output of each of the burners can be regulated to give a desired longitudinal temperature profile.

Where, as in the cuprous halogen treating process, a special vapor phase is to be maintained inside of the tunnel it is preferred to use air doors to minimize escape of the treating vapor and to minimize heat transfer through the ends of the tunnel. I have found that air doors that direct a sheet of air transversely across the tunnel from top to bottom thereof, without any opposed outlet, are especially effective for this purpose.

It is recognized that continuous muffle furnaces are known in the broad sense, one such furnace (for the manufacture of coke) being shown and described in U.S. Pat. No. 1,730,570. There, the muffle extends vertically, and the conveyor is an auger. Schmidt U.S. Pat. No. 3,459,414 shows apparatus for convective heat treatment of a metal billet wherein the billet is seated in a vertical chamber with a top outlet, and gas jets are directed angularly into an annular space around the billet. There is no muffle or conveyor, and the hot gases rise to the top of the furnace. Plotkowiak U.S. Pat. No. 3,470,624 is similar, in that a cylindrical billet of metal is seated in the center of a vertical chamber. Cooling gas is directed tangentially into an annular space around it, which is swept out to a top outlet. No muffle or conveyor is shown. The prior art constructions do not provide the horizontal helix or swirl of hot gas around the outside of an open ended muffle, as this invention provides.

The invention can best be further described by reference to the accompanying drawings, in which:

FIG. 1 is a side elevation, somewhat diagrammatic in nature, of a furnace in accordance with the invention, in a preferred form for the cuprous halogen vapor treatment of glass bottles;

FIG. 2 is an enlarged axial section of a portion of the tunnel of the furnace of FIG. 1, showing the inlet air door;

FIG. 3 is an axial section of another portion of the tunnel of the furnace of FIG. 1, showing the air door-drift controller in the vapor treatment section of the tunnel;

FIG. 4 is an axial section of another portion of the vapor treatment section of the tunnel showing the crosschute for boats that will contain the cuprous halogen source;

FIG. 5 is a transverse section taken on line 5—5 of FIG. 2, the same configuration also appearing on line 5—5 of FIG. 3;

FIG. 6 is an enlarged transverse sectional view taken on line 6—6 of FIG. 1; and FIG. 7 is an enlarged transverse sectional view taken on line 7—7 of FIG. 1.

The specific furnace illustrated in the drawings and described below is especially useful for the cuprous halogen vapor process, but the invention is not limited to such use.

The furnace of the illustrated embodiment includes four longitudinal sections, each of which is made separately for end to end assembly in situ. The first three of the four sections are heating sections; the fourth section is a cooling section and has no gas burners in it. All are traversed by a horizontal conveyor 10 which runs longitudinally through the furnace from end to end thereof. The conveyor travels on a horizontal run between end rolls (not shown), and returns on a run beneath the furnace. In FIG. 1, the direction of conveyor travel is from left to right, as designated by the arrow at 15.

The four sections of the furnace are designated as 11 through 14. The first section 11 constitutes a temperature equilizing section wherein articles traveling on the conveyor are heated and brought to uniformly elevated temperature; the next section 12 comprises the vapor treatment section, in which the articles are contacted with the treating vapor. The third section 13 is an annealing section, in which the articles—out of substantial contact with the treating vapor—go through a controlled gradual temperature reduction. The fourth section, designated at 14, is merely a final cooling section and has no burners in it.

In each of sections 11-14, the conveyor 10 runs through a surrounding tunnel or muffle, designated at 20. As best shown in FIG. 6, tunnel 20 is a duct or tube which may be rectangular in cross-sectional shape. It rests on support means in the form of longitudinally spaced stands or brackets 21. The brackets 21 position tunnel 20 so that it is essentially centered in the hollow, surrounding combustion enclosure designated generally at 22. The combustion enclosure 22 has an inner wall surface 23 which surrounds but is spaced radially from the tunnel 20 so that an open, generally annular combustion zone 25 is defined around tunnel 20, between the tunnel and wall 23.

More specifically, the furnace enclosure 22 includes an outer liner or shell 26 of sheet metal. This shell 26 supports and protects flat insulating elements which are mounted to it by bolts or studs 28. The insulation is suitably in two layers, a thicker outer insulation layer 29 comprising batts of refractory fibers, and a thinner layer 30 comprising compressed, mechanically rigid and durable slabs of a refractory insulating material. For the cuprous halogen process, the insulation should be capable of withstanding temperature up to about 2,000°F. "Fiberfax" insulation, manufactured by Babcock and Wilcox Corporation, is available commercially in the forms described and is suitable.

The bolts 28 project inwardly from shell 26 and pass through both layers of insulation 29 and 30, both layers being held in place by fastenings 31. The standards 21 project upwardly from shell 26 through apertures 35 in the insulation.

It can be seen in FIG. 6 that the inner layer of insulation 30 defines an internal space around tunnel 20 that is square or rectangular in section. In order to promote a more uniform circular or swirling movement of flame around the tunnel 20 (as subsequently described), the longitudinal edges at which the vertical and horizontal surfaces of the insulation layer 30 meet, are rounded by curved filet segments 32. The filets are mounted and supported on the bolts 28. Thus, the inner wall 23 of combustion zone 25 is comprised by the filet sections 32 and portions of the surfaces of the inner insulation layer 30. Together, these define the approximately circular sectioned surface or wall 23 around combustion zone 25.

From a theoretical standpoint, it would be desirable that tunnel 20 also have a circular cross-section, similar to wall 23, for the most uniform swirling flow of gas around it. However, in order to withstand the corrosive action of certain treating vapors, including cuprous chloride, it is desirable to use stainless steel as the tunnel material. Circular tubes of stainless steel of the necessary diameters are not readily available and would be expensive to fabricate. It is convenient and less expensive to produce the tunnel 20 from flat plate or sheet stainless material by forming it as a rectangular box with welds at the long edges. In use, this has been found not to limit unduly the swirl of the burning gas around it. For resisting attack of CuCl vapor in section 12, No. 601 Inconel stainless works as well as the tunnel material. In the other sections, and for the stands, No. 316 stainless is satisfactory since they are not exposed to the concentrated vapor.

The conveyor 10 travels through the tunnel over its base or bottom, and is supported on and guided therein by longitudinally extending angles or brackets designated at 33. These prevent wear between the tunnel surface and the belt.

The tunnel is preferably not fastened rigidly to the stands 21, but sits between guide edges 34, 34 presented at the tops of each stand. Relative longitudinal movement (as much as 2-4 inches for a 21 foot long tunnel) between the tunnel and the stands will occur by reason of thermal expansion of the tunnel as it is heated, in relation to the shell 26 to which the stands 21 are mounted, and this is accommodated by the slidable supports described.

The combustion zone 25 is heated by burning of natural gas or the like within it. Each section 11-13 is a separate furnace, and each is heated by a plurality of gas burners, each designated at 37.

In the illustrated embodiment, the combustion zone of the temperature equalizing section 11 is heated by two burners, the vapor treatment section 12 is heated by three burners, and the annealing section 13 has four burners, some of which may not be needed, depending upon the annealing schedule. The number of burners in any particular section is not critical to the invention, and will depend upon the nature of the heat treatment to be used and the type and rate of articles being treated.

Each gas burner 37 can be of a type which is known per se; preferably it is of the co-called "excess air" type. Excess air burners operate with the forceful injection of a large excess of air directly into the gas to be burned. This excess air is usually within the range of 2-10 times the quantity of air necessary for stoichoimetric combustion of the gas flow. In the illustrated embodiment a 300-400 percent excess is used. The flame has a high forward velocity, and a much more uniform temperature than an ordinary gas flame. Such burners are commercially available; as an example of one suitable type, the burners in the furnace illustrated are "Series 4423 XS Air Gas Burners," made by North American Mfg. Co., Cleveland, Ohio.

As shown in FIGS. 1 and 6, the burners 37 of each section are spaced from one another in the longitudinal direction, and they enter the combustion chamber 25 alternately above and below tunnel 20, and from opposite sides. In other words, the burners are staggered and opposed, being above the muffle on one side, and below it on the other. The burners enter the combustion zone tangentially, through ports 37 in the wall 23. Ideally, the burners are positioned so that if the axis of the burner were extended to a point half way across the combustion zone, it would roughly perpendicularly bisect a radial line 40 drawn from the tunnel 20 to wall 23 (see FIG. 6). Thus, in operation each burner directs the flame across the top or bottom of the tunnel circumferentially around the combustion zone. The circular slope of inner wall 23 deflects the flame around the tunnel, so that a swirling motion of flame and hot air is established around the outside of the tunnel, see FIG. 6. The heating flame virtually surrounds the exterior surface of the tunnel, passing between the brackets 21 which support it from below, and around the four sides of the tunnel. This produces extremely even temperatures across any given sectional area of the tunnel. Data shows that the temperature at the top of a bottle (shown in phantom at 24 in FIG. 6) in the tunnel is within 5° of the temperature at the bottom of the bottle.

Each section 11-13 has an exhaust stack or outlet 38 which is adjacent an end of the section. The stack extends from the combustion zone 25 through the insulation layers 29 and 30, and through the shell 26. The stack is equipped with a damper and a furnace pressure gage, not shown.

Control thermocouples are located inside the tunnel in each section, and each section has its own automatic temperature control which may be of conventional type.

The burning gas and excess air swirls as a helix from the burners to the stack 38 adjacent the end of the section. This gas bathes the tunnel and extends entirely around it, by reason of the vortex established by the tangential injection and the spiral gas flow to the stack.

The tunnel isolates the products of gas combustion outside it in the combustion zone, from the treating vapor and the articles in the tunnel, so that no reaction between them takes place; likewise, the burners in the combustion zone are isolated from the treating vapor, so that corrosive attack of the burners or wall 23 by the treating vapor does not occur. Heat is conducted evenly through the tunnel wall from all sides (including the top and bottom); the swirling gas movement "irons out" hot spots.

In the furnace illustrated, changes in the longitudinal temperature profile are needed. Where this is a consideration, it is desirable to block axial flow of combustion gases in zone 25, from one section to another. This is accomplished by provision of bulkheads or partitions of the type designated at 40. These are positioned at the joints of flanges 41 at which the sections are connected end to end. As shown in FIG. 7, the bulkheads 40 are metal sheet or plate partitions which at their outer edges are clamped between the mating flanges 41 and which extend radially inward across the combustion zone 25, toward tunnel 20. The bulkheads must not however be connected rigidly to the tunnel; their inner edges 42 are just slightly spaced from the tunnel wall. The bulkheads 40 are partly segmented by radially extending slots or slits 43. Thus, inner portions of bulkheads 40 within the combustion zone 25 and adjacent the tunnel 20 can expand without buckling under the heat of combustion, relative to the cooler outer portion at the flanges 41 adjacent shell 22. The slots 43 are closed or very narrow at operating temperature. Axial shifting of the tunnel due to longitudinal expansion relative to the bulkheads is also accommodated, since they are not connected.

The bulkheads impede longitudinal flow of flame and combustion products from section to section, and if all three sections 11-13 are maintained at about the same furnace pressure, temperatures in each section along the length of the tunnel can be controlled independently.

By way of illustration of the controllability of temperature, in the particular furnace illustrated, the belt travels at a rate of 22 inches per minute. The ware entering equalizing zone 11 has a temperature of about 250-375°F. Travel time in the first zone is 2.2 minutes.

The oven temperature (as measured by a traveling thermocouple) increases in the first minute of travel to about 1,120°F., then more slowly to about 1,260°F. in the next minute, then holds at about 1,260 for the remainder of the first zone. (Note the stack 38 is located in the direction of conveyor travel from the burners in this zone). This is the peak temperature in the particular furnace illustrated. At this point, the temperature in zone 25 outside the muffle is about 1,280°F. Travel time in the treating zone 12 is 2.4 minutes, during which the temperature drops approximately lineally from 1,260° to 1,170°. In the annealing zone 13, temperature is reduced from 1,170° to 1,010°F. in 3 minutes, then more rapidly to 700° in the next 1.0 minutes of travel. (For this rate of drop, operation of only two of the four burners is necessary.) In the unheated cooling zone 14, temperature drops to about 280° in 3.3 minutes. A time or position versus temperature trace displays virtually no "bump" as the ware traverses the burners. The oven temperatures are adjusted so that actual ware temperature never quite reaches its softening point.

Tunnel 20 is open ended, that is, it has no door or closure at either end. In order to minimize the flow of cooler outside air into the tunnel, and at the same time to prevent the loss of heat and/or treating vapor through the open ends of the tunnel, air doors are mounted at various stations along the tunnel. Specifically, an inlet air door is positioned at the entrance to the tunnel in section 11, and an outlet air door is provided in section 13. Additional air doors of a somewhat different type are provided at spaced positions in the vapor treatment section 12.

The entrance and exit air doors are designated at 45 and 46, and may be similar to one another. The doors within the vapor treatment section are designated at 47 and 48, and are similar to one another but they are angulated to direct flows toward one another, as will be described. In each case, the tunnels use dry air (−80°F. dew point) in order to avoid the introduction of moisture into the tunnel. The entrance and exit air doors 45 and 46 each direct a thin sheet of air, moving at relatively low velocity (e.g., 100-300 fpm) transversely or perpendicularly into the tunnel from the top thereof. No special air door exhaust duct is provided for either door, and the flow they inject tends to "pressurize" the inside of the tunnel and thereby to pump heated gases back into the furnace and to prevent entrance of cool outside air. It has been found unnecessary to collect or recirculate the atmosphere.

Each tunnel door 45 and 46 includes a nozzle 50, generally rectangular in cross-section (see FIGS. 2 and 5), which extends tranversely across the tunnel, preferably at the top thereof. The nozzle is not full width, and as shown in FIG. 5, extends across the central two-thirds only of the width of the tunnel. The short or less-than-full width of the nozzle 50, in relation to the tunnel width, avoids long air flow along the sidewall. This minimizes air current drag on the tunnel sidewalls and also promotes flow with minimal swirl and cross-mixing in the tunnel. The edges of the air flow from nozzles 50, 54 are approximated by the dotted lines in FIG. 5.

Each nozzle is fed through a large rectangular plenum chamber 51, which in turn is fed by a flow straightener section 52. The latter comprises a bundle of tubes of relatively small diameter; in the illustrated embodiment there are 37 such tubes, each having an external diameter of three-eighths inch, 3 ¼ inches long and tack welded together to form the bundle. Air is supplied to this source from a dry (−80°F.D.P.) compressed air line located outside of the furnace, through a long line 53 (see FIG. 6). The line 53 passes through inner wall 23, and has a relatively long travel around the combustion zone 25, so that air passing through line 53 is heated to a furnace temperature in its travel to the plenum chamber 51. Flow straightener 52, in combustion with the plenum 51, promotes temperature uniformity with minimal turbulence of the air entering the tunnel. This insures more laminar flow, with a minimum of mixing with atmospheric air. In this connection, it has been found that the low air velocities mentioned are far more desirable for this purpose than higher velocities.

Air doors 45 and 46 have nozzles 50 which are directed perpendicularly to the conveyor, as shown in FIG. 2. In contrast, the air doors 47 and 48, where the tunnel enters and leaves the vapor treatment section 12, have nozzles 54 which are directed angularly toward one another, see FIGS. 2 and 3. This angle, designated at 55, in FIG. 3, is preferably 20° to 30° with respect to a line perpendicular to the belt. In other respects, these doors 47 and 48 and their air supplying ducts are similar to the doors 45 and 46.

The angulated nozzles of doors 47 and 48 accomplish several things:

1. The treating vapor is pumped toward the center of the treatment section 12, so that escape of vapor to the equalizing section 11 or the annealing section 13 is reduced;
2. They create a stirring action such that temperature and vapor concentrating uniformity are promoted, and thereby eliminate a need for circulating fans;
3. These curtains control "drift" through the tunnel. More specifically, concerning this latter effect, the length of the furnace may be such that a pressure differential will exist between its two ends, and there may be a gentle flow of air from one end through the tunnel to the other end. This most frequently occurs on days when it is very windy outside the plant. Drift is not merely the result of conveyor movement, and in fact can move in the opposite direction to the conveyor. If not counteracted, such "drift" can result in undesirable loss of heat and/or vapor. If drift occurs, it can be counteracted by increasing the air flow through one of the air doors 47 or 48, and/or reducing that in the other 48 or 47. Alternatively or in addition, the furnace may also be provided with a drift control tube of the type described in my previously identified application.

The means for generating a treating vapor do not comprise a part of the invention, and will depend on the particular type of treatment in which the tunnel is to be used. Where the tunnel is to be used for a cuprous chloride vapor treatment, suitable vapor generating means are described in my previously identified patent application Ser. No. 62,489.

To introduce a vapor (if used) into the treatment section, a cross tube 60 extends through and across the furnace at the middle of the vapor treatment section 12, directly beneath tunnel 20. It communicates with the interior of the tunnel through an opening 56. Refractory boats containing a supply of granular cuprous chloride or other treating material are introduced, through a suitable closure at one end of this tube 60, and are pushed in a line through the tube. The temperature of the boats increases as they pass through the combustion zone 25, sufficiently that copper chloride vapor is generated, which rises into the treating tunnel 20 as the boats pass beneath opening 56. After depletion of their supply of cuprous chloride, the boats are withdrawn from the other side of the furnace. The entrances and exits to tube 60 are preferably cooled to permit handling of the boats at the loading and discharging ends thereof.

The furnace pictured and described is dimensioned for a single line of articles. Where the number of articles to be treated is much greater, the capacity of the furnace can be increased by use of a wider tunnel, carrying a belt with multiple lines of articles, or by use of a plurality of tunnels mounted at laterally spaced positions across a wide combustion zone. To accommodate thermal expansion of a wide tunnel and to support its roof under the effect of the high temperatures used in the glass treating example, it is desirable in the latter case to "hang" the tunnel roof from the shell. For this purpose it is contemplated that stainless steel rods would extend upward from the outside of the muffle roof, through the combustion zone to cross beams to the top outside of the furnace.

The invention also contemplates a new method of heat treating glass articles, by placing them generally in line on a conveyor, continuously moving the conveyor with the articles on it through the open ended muffle while heating the muffle, or at least the mid portion of it, with hot gasses that are applied tangentially to its exterior surface and caused to flow in the longitudinal direction as a helix around the outside surface of the muffle.

While I have described a particular type of furnace in accordance with my invention, for use in the cuprous halogen treatment of glass articles, those skilled in the art will appreciate that other embodiments of the invention may be used in accordance with the scope of the claims which follow.

I claim:

1. A method of treating glass articles comprising,
   placing the articles in lineal arrangement on a conveyor,
   moving the conveyor in the horizontal direction, with the articles on it, through an open ended muffle while heating at least a portion of said muffle,
   said heating being carried out by directing hot gasses tangentially to the exterior of said muffle and causing said gasses to flow in the longitudinal direction as a helix around the outside of said muffle.

2. The method of claim 1 wherein a treating vapor is injected into the interior of the muffle to contact the articles moving therethrough on said conveyor.

3. A method for continuous heat treating of glass articles, said method comprising,
   providing an open-ended elongated tunnel furnace having a horizontal axis,
   enclosing said tunnel over at least a part of its length within a generally cylindrical combustion enclosure which is spaced radially from the tunnel so that a hollow annular combustion zone is established between the enclosure and the tunnel,
   supporting the tunnel centrally within the enclosure so that gases can freely swirl around it,
   injecting burning gases into said combustion zone in a direction generally tangential to the tunnel, said gases being injected at velocity such that they circulate in said zone about the axis of said tunnel and completely encircle said tunnel on all sides thereof, and moving the articles on a conveyor through said tunnel.

4. The method of claim 3 wherein said gases are injected into said zone through said enclosure at a plurality of longitudinally spaced positions so that the gases cooperate to form a circular motion pattern along the zone.

5. The method of claim 3 wherein combustion products of said gases are exhausted from said zone through an opening spaced longitudinally from where the gases are injected, so that the gases advance in helical spiral fashion from injection to exhaust.

* * * * *